United States Patent
Ramos et al.

(10) Patent No.: US 10,901,944 B2
(45) Date of Patent: Jan. 26, 2021

(54) STATELESSLY POPULATING DATA STREAM INTO SUCCESSIVE FILES

(71) Applicant: Microsoft Technology Licensing, LLC, Redmond, WA (US)

(72) Inventors: Rogerio Ramos, Redmond, WA (US); Fayssal Martani, Seattle, WA (US); Cristian Diaconu, Kirkland, WA (US); Karthick Krishnamoorthy, Sammamish, WA (US); Jacob R. Lorch, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 216 days.

(21) Appl. No.: 15/604,396

(22) Filed: May 24, 2017

(65) Prior Publication Data

US 2018/0341659 A1 Nov. 29, 2018

(51) Int. Cl.
*G06F 16/13* (2019.01)
*G06F 16/11* (2019.01)
(Continued)

(52) U.S. Cl.
CPC .............. *G06F 16/13* (2019.01); *G06F 3/067* (2013.01); *G06F 3/0619* (2013.01);
(Continued)

(58) Field of Classification Search
CPC ..................................................... G06F 16/13
(Continued)

(56) References Cited

U.S. PATENT DOCUMENTS 9,241,170 B1 * 1/2016 Galligan ............... H04L 65/601
9,489,434 B1 11/2016 Rath
(Continued)

FOREIGN PATENT DOCUMENTS

KR 20160004721 A 1/2016

OTHER PUBLICATIONS

Rao, et al., "Using Paxos to Build a Scalable, Consistent, and Highly Available Datastore", In Proceedings of 37th International Conference on Very Large Data Bases, Aug. 29, 2011, pp. 243-254.
(Continued)

*Primary Examiner* — Syling Yen
(74) *Attorney, Agent, or Firm* — Workman Nydegger

(57) ABSTRACT

Storing an incoming data stream using successive files that are consecutively populated. The appropriate file to populate a given data stream portion into is determined by mapping the data stream offset to a file, and potentially also an address within that file. The successive files may be the same size, so that the file can be identified based on the data stream address (or offset) without the use of an index. Furthermore, the files may be easily named by having that size be some multiple of a binary power of bytes. That way, the files themselves can be automatically and named and identified by using the more significant bit or bits of the data stream offset to uniquely identify the file and establish ordering of the files. Replication may occur from a primary to a secondary store by transmitting the offset, and the actual data to be stored.

18 Claims, 4 Drawing Sheets

(51) Int. Cl.
*G06F 16/16* (2019.01)
*G06F 16/178* (2019.01)
*G06F 16/182* (2019.01)
*G06F 3/06* (2006.01)

(52) U.S. Cl.
CPC ......... *G06F 3/0643* (2013.01); *G06F 16/128* (2019.01); *G06F 16/162* (2019.01); *G06F 16/178* (2019.01); *G06F 16/1844* (2019.01)

(58) Field of Classification Search
USPC ........................................................ 707/812
See application file for complete search history.

(56) References Cited

U.S. PATENT DOCUMENTS

| | | | |
|---|---|---|---|
| 9,542,397 B1* | 1/2017 | Graham | G06F 3/065 |
| 2010/0023932 A1* | 1/2010 | Eichenberger | G06F 8/4442 |
| | | | 717/160 |
| 2012/0028567 A1* | 2/2012 | Marko | H04H 20/57 |
| | | | 455/3.02 |
| 2012/0159098 A1* | 6/2012 | Cheung | G06F 12/0261 |
| | | | 711/162 |
| 2013/0110781 A1 | 5/2013 | Golab et al. | |
| 2014/0181036 A1* | 6/2014 | Dhamankar | G06F 17/30144 |
| | | | 707/648 |
| 2014/0195489 A1 | 7/2014 | Wang et al. | |
| 2015/0379099 A1 | 12/2015 | Vermeulen et al. | |
| 2017/0255388 A1* | 9/2017 | Sharma | G06F 3/064 |

OTHER PUBLICATIONS

Massey, Simon, "Cluster Replication With Paxos", https://simbo1905.wordpress.com/2014/10/28/transaction-log-replication-with-paxos/, Published on: Oct. 28, 2014, 7 pages.

Fetterly, et al., "TidyFS: A Simple and Small Distributed File System", In Proceedings of USENIX Conference on USENIX Annual Technical Conference, Jun. 15, 2011, 14 pages.

\* cited by examiner

STATELESSLY POPULATING DATA STREAM INTO SUCCESSIVE FILES

BACKGROUND

Computing systems and associated networks have greatly revolutionized our world ushering in what is now commonly called the "information age". One form of data that may be consumed is called a "data stream". A data stream is a sequence of ordered data items. Although not required, the data stream is often consumed in the sequence. As an example, a video stream is an ordered sequence of video frames. When watching a video stream, the frames are often presented in order for viewing and/or recording. Likewise, an audio stream is an ordered sequence of audio samples, which are presented in order or listening or recording. Events of a log (e.g., a database transaction log) may also be streamed, where the log entries are ordered by event log time. A log stream may be replayed for example when recovering from a particular checkpoint after a system failure.

When data streams are recorded, the data stream may be recorded into a single file. Often, the size of the data stream is not known beforehand, and thus such files can grow to become very large. Furthermore, it is often desired to remove some of the earlier portions of the data stream. For instance, a system may remove portions of a video or audio stream that are earlier than a certain point on the assumption that it is unlikely that a viewer or listener would rewind to early than that point. For log event data stream, events that are earlier than the last checkpoint may be deleted as recovery may begin from that checkpoint and thus replaying the event stream from that checkpoint would result in a correct current state.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a method of storing an incoming data stream. Successive files are established for purposes of receiving the incoming data stream. As the incoming data stream is received, the data stream is populated into the respective files. The appropriate file to populate a given data stream portion into is determined by mapping the address (or offset) of the data stream portion to a file, and potentially also an address within that file. This mapping is performed without having an index or storing any state.

In one embodiment, the successive files are the same size, so that the file can be identified based on the data stream address (or offset) without the use of an index. Furthermore, the files may be easily named by having that size be some multiple of a binary power of bytes. That way, the files themselves can be automatically named and identified by using the more significant bit or bits of the data stream offset to uniquely identify the file and establish ordering of the files.

Thus, the file can be found without even knowing ahead of time which files have been created, and what their names are. Files that hold parts of a data stream prior to a particular offset can be quickly identified (e.g., for potential removal). This also facilitates precreation of the files well in advance of being populated by the incoming data stream such that there is a buffer of available files beyond the current file being populated. Thus, population need not await file creation.

Replication may occur from a primary store to a secondary store simply by transmitting the data stream offset, and the actual information or data to be stored, provided that the secondary store is also performing this same process. Again, the storage may be a stateless process based solely on the data stream offset. The size of the files created on any given secondary may even be the same as, or different than, the size of the files on the primary, without affecting the overall process. For instance, the files on one secondary store may be half the size of the files on the primary store. The files on another secondary store may be four times the size of the files on another secondary store. Thus, each computing system, primary and secondary, may determine for itself the appropriate size of the files, while still only needing the data stream offset in order to determine which file, and where in that file, to write to or read from.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
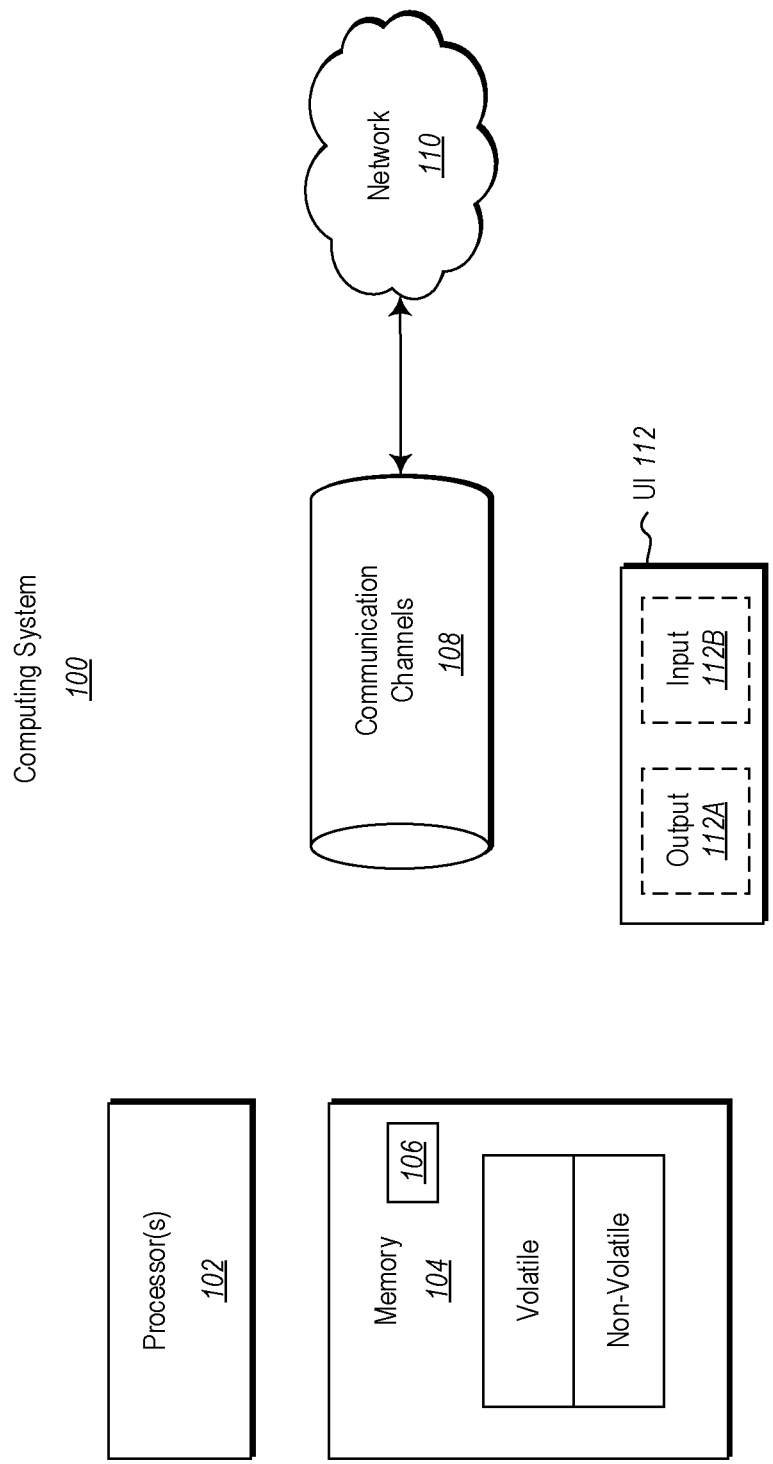
FIG. 1 illustrates an example computer system in which the principles described herein may be employed.

At least some embodiments described herein relate to a method of storing an incoming data stream. Successive files are established for purposes of receiving the incoming data stream. As the incoming data stream is received, the data stream is populated into the respective files. The appropriate file to populate a given data stream portion into is determined by mapping the address (or offset) of the data stream portion to a file, and potentially also an address within that file. This mapping is performed without having an index or storing any state.

In one embodiment, the successive files are the same size, so that the file can be identified based on the data stream address (or offset) without the use of an index. Furthermore, the files may be easily named by having that size be some multiple of a binary power of bytes. That way, the files themselves can be automatically named and identified by using the more significant bit or bits of the data stream offset to uniquely identify the file and establish ordering of the files.

Thus, the file can be found without even knowing ahead of time which files have been created, and what their names are. Files that hold parts of a data stream prior to a particular offset can be quickly identified (e.g., for potential removal). This also facilitates precreation of the files well in advance of being populated by the incoming data stream such that there is a buffer of available files beyond the current file being populated. Thus, population need not await file creation.

Replication may occur from a primary store to a secondary store simply by transmitting the data stream offset, and the actual information or data to be stored, provided that the secondary store is also performing this same process. Again, the storage may be a stateless process based solely on the data stream offset. The size of the files created on any given secondary may even be the same as, or different than, the size of the files on the primary, without affecting the overall process. For instance, the files on one secondary store may be half the size of the files on the primary store. The files on another secondary store may be four times the size of the files on another secondary store. Thus, each computing system, primary and secondary, may determine for itself the appropriate size of the files, while still only needing the data stream offset in order to determine which file, and where in that file, to write to or read from.

The principles described herein also is consistent with systems in which there is first a request to write into storage and second a confirmation that the write is complete. The system will support a stream in which writes are made into storage for one part of the stream, even though writes for previous parts of the stream have not yet been confirmed as completed. The official end of the written stream is based on requests that are confirmed as written (leaving the written stream without holes).

Because the principles described herein operate in the context of a computing system, a computing system will be described with respect to FIG. 1. Then, the principles of storing a data stream into successive files will be described with respect to FIGS. 2 through 6.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
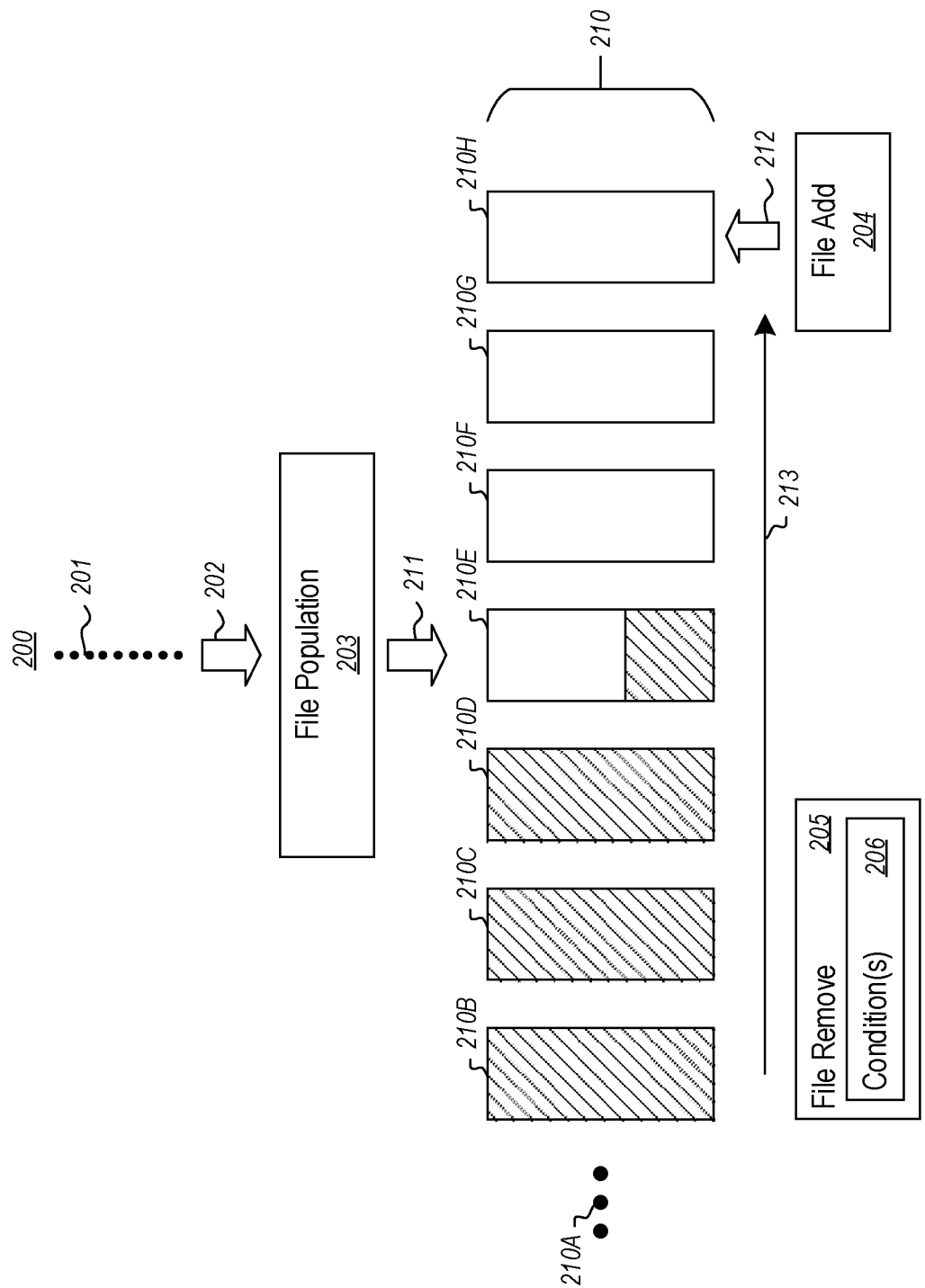
FIG. 2 illustrates an environment in which an incoming data stream is populated into successive files.

FIG. 2 illustrates an environment 200 in which an incoming data stream 201 is populated into successive files 210. The incoming data stream 201 is received (as represented by arrow 202) at a file population component 203. The file add component 204 adds (e.g., creates or takes a file from a pool of recycled files) a successive sequence of files 210 into which the data stream will be populated (as represented by arrow 211) one file at a time. The files are pre-added ahead of time, to prevent the streaming procedure from being blocked. This is especially important when a file is added via creation, as it can take much more time to create a file that add a file from an existing pool of recycled files. The direction of file population is represented by arrow 213. As illustrated, a file being populated by the data stream is represented by all of the file having diagonal hash marking. A file that is partially populated by the data stream is represented by some of the file having diagonal hash marking. A file that is unpopulated with any of the data stream is represented by the file not having hash marking. Pre-created files are also pre-sized in order to avoid the difficulties of timely growing a file as needed when populating.

In the illustrated embodiment, the file creation component 204 has just created file 210H (as represented by arrow 212), and will be populated after file 210G is populated (as represented by arrow 213 being the direction of population). File 210G is awaiting population, and will be populated after file 210F is populated (as also represented by arrow 213 being the direction of population). The file 210F is the next in line to be populated (as represented by arrow 213 being the direction of population). The file 210E is the file being currently populated. Files 210D, 210C and 210B are files that have already been populated by successively earlier portions of the data stream (as represented by arrow 213 being the direction of population). The ellipses 210A represents that there may be any number of already populated files that hold yet earlier portions of the data stream.

Thus, the data stream may be populated into an ever growing collection of files. Although not required, a file removal component 205 may apply one or more conditions 206 to determine whether to remove files that contain data stream portions that are earlier than a certain point. File removal may be accomplish by deleting a file, or perhaps just recycling the file and placing the file into a pool of available recycled files from which the file add component 204 may draw. Recycling is much more efficient as simple renaming of a file is much faster to perform that deleting and creating a file.

For instance, if the data stream were an event data stream representing a log (e.g., a database log where the events might include transaction events), then the file remove component 205 might remove files that entirely contain events that occurred prior to a checkpoint that has just been confirmed as completing. Each of the file population component 203, the file add component 204, and the file remove component 205 represents examples of the executable component 106 of FIG. 1. Accordingly, the computing system 100 of FIG. 1 may operate to create the environment 200 of FIG. 2.

If the data stream were a video stream or an audio stream, then perhaps the file remove component 205 might remove files that contain video and/or audio that is earlier than a certain time in the stream. For instance, in an audio stream, there might be a policy to remove files that contain streams that were played 3 or more songs ago, or perhaps 30 minutes or more ago. In a video stream, there might be a policy to remove files from more than 5 scenes ago, or that were originally seen more than some time ago. The exact conditions upon which to remove a file will depend on the application logic that consumes the data stream. In any case, if deletion of files occurs, then the collection of files 210 may be considered as a rolling collection of files, with the current file being filled being in the middle of the collection of files, with there being unfilled pre-created files to one side awaiting population with future portions of the stream, and with there being already populated files to the other side.

Figure 3:
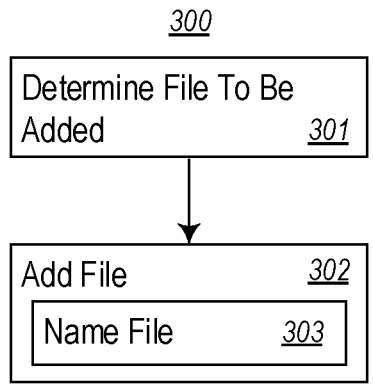
FIG. 3 illustrates a method for creating or adding files to successively store an incoming data stream.

FIG. 3 illustrates a method 300 for adding files to successively store an incoming data stream. The method 300 may be performed by the file add component 204 of FIG. 2. The method 300 includes determining that a file should be added (act 301), and in response, adding the file (act 302). This method 300 may be performed each time the file add component 204 determines that a file should be added. In one embodiment, the files are added so as to create a minimum number of pre-created (and pre-sized empty files, to ensure that there is a file already available when the data stream is ready to populate the next file (i.e., has just populated the prior file). For instance, if the file is added by creation, it can take some time to create a file. By pre-creating or pre-adding files with a given lead time ahead of the current file that is being filled, the population process does not have to stop and wait for a next file to be created or added. Also, by pre-sizing the file, the time required to grow a file is avoided during population since the files are the same size and the files are pre-created at that size.

The files may be added so that they are the same size for all files that store a data stream. This allows for a data stream address or offset to be deterministically mapped to a given file and a given address within the file, without having to use any state. The mapping process would divide the data stream offset by the size of each file. Rounding to the next integer will allow the file to be identified based on its order within the succession of files. The remainder is directly related with the local offset within of the file. A particular optimization that makes this particularly straightforward will be now be described with respect to the automatic naming of the files.

Part of the add process (act 302) involves naming the file (act 303). If fact, when adding from a pool of recycled filed, adding involves only naming the file. In one embodiment, this is done automatically, and guarantees uniqueness across the collection of files that store a data stream. Furthermore, the naming convention informs as to the order of the files. This may be accomplished by 1) adding the files of the same size, 2) having that same size be some binary power of bytes (e.g., $2^n$ bytes where n is a whole number), and 3) having at least part of the file named with the most significant bits (those bits that are in the n+$1^{th}$ place and above). In a very simple embodiment, the first file is simply named "0", the second "1", the third "2" (or 10 in binary), and so forth. Such bits may be expressed in hexadecimal form or any other form that represents the more significant bits. In this case, the mapping reduces to simply identifying the n+$1^{th}$ and higher significant bits of the data stream address.

Figure 4:
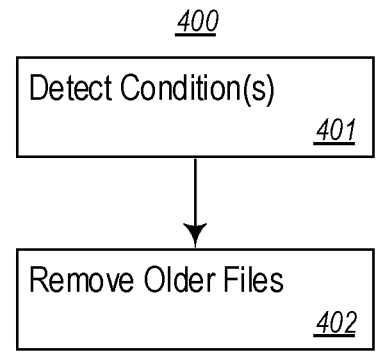
FIG. 4 illustrates a flowchart of a method for deleting or recycling populated files that contain an earlier portion of the incoming data stream.

FIG. 4 illustrates a flowchart of a method 400 for removing populated files that contain an earlier portion of the incoming data stream. This method 400 may be performed by the file removal component 205 of FIG. 2. Upon detecting the occurrence of one or more conditions that correspond to a particular time (act 401), the files that contain data streams from earlier than that particular time are removed (act 402). In this manner, the method 300 of FIG. 3 operates to add unpopulated files pre-readied for population, and the method 400 of FIG. 4 operates to remove populated files. The result is to have a rolling window (perhaps a variable sized window) in which the file population component 203 populates files.

Figure 5:
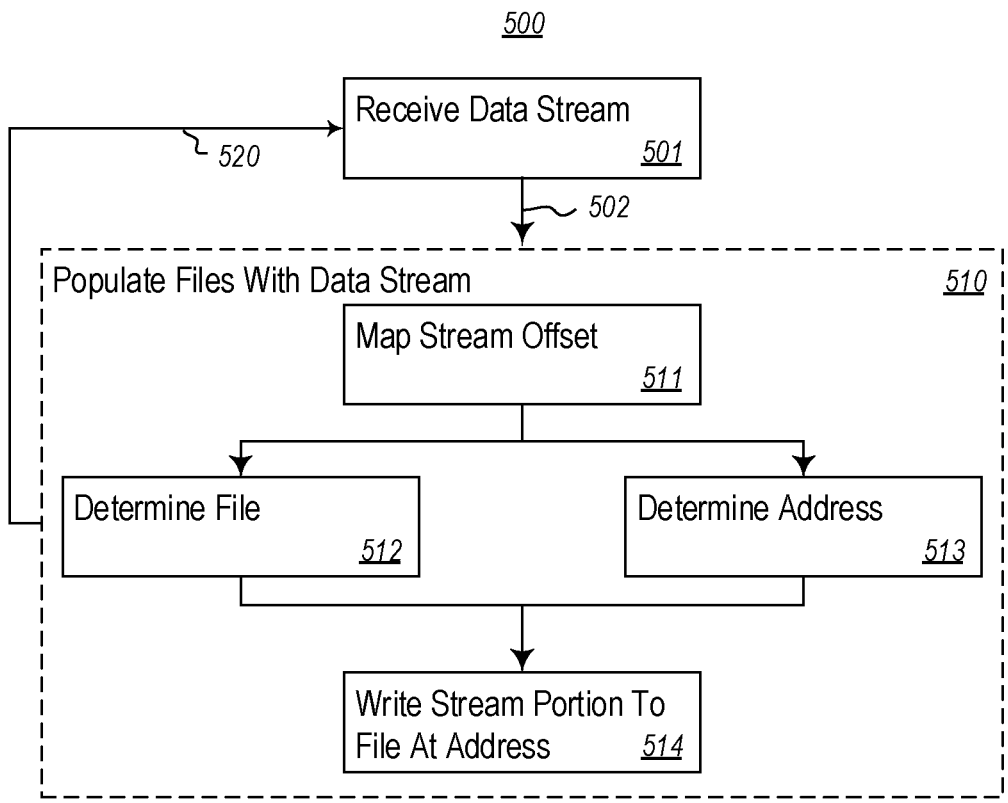
FIG. 5 illustrates a flowchart of a method for populating an incoming data stream into successive files.

FIG. 5 illustrates a flowchart of a method 500 for populating an incoming data stream into successive files. The method 500 may be performed by, for instance, the file population component 203 of FIG. 2. The incoming data stream is received (act 501). This is represented in FIG. 2 by the incoming data stream 201 being received as represented by the arrow 202. Also, the files are populated with the incoming data stream (act 510). This is a continuous process are represented by the arrows 502 and 520.

As part of populating the files (act 510), for each stream portion address (or offset), that stream portion address is statelessly mapped (act 511) to a corresponding file and file address to identify which file (act 512) and at what file address (act 513) to write the stream represented by that offset. For instance, take the embodiment in which each file is of size $2^n$ bytes, where n is a positive integer. Suppose that "n" is 10 such that each file is $2^{10}$ bytes (or one kilobyte KB). Now suppose that the stream of offset 1.5 kilobytes (expressed as the following in binary 1,10000,00000), of size 0.25 kilobytes (expressed in binary as 1000,00000). From the offset, we know that the $11^{th}$ and higher order bits is simply 1. Thus, the file is already identified, and perhaps named as "1". Furthermore, the remainder of the bits 10000, 00000 identify the address within the file named "1" at which the stream portion will be written, which will occupy addresses from 10000,00000 to 11000,00000 within file 1. This mapping occurred by applying a deterministic mapping method, and without requiring any information except for the data stream offset itself. Similarly, if under the same circumstances, the data stream at offset 11,10000,00000 was to be written, the filed name 11 (in binary) or 3 (in based 10 or hexadecimal) is accessed, and the writing begins half way into the file at location 10000,00000.

In one embodiment, the files added (e.g., files 210) are each logical files supported by a larger physical file. That allows for logical files to be written to beginning at the appropriate file address, but in which the stream portion being written is longer than the logical space remaining in the file. For instance, suppose that each logical file was 1 KB in size, and that a maximum append size for an additional stream portion to the file is 0.4 KB. In that case, the physical file supporting the 1 KB logical file would actually be at least 1.4 KB. If appending a stream portion of size 0.4 KB beginning at logical address 0.9 KB, then the append will be permitted by writing to locations 0.9 KB to 1.3 KB in the physical file. To ensure the mapping still is proper, the first 0.3 KB in the next successful file would be left blank. This maneuver makes an input from the stream map to one write to one file (and not multiple writes to multiple files).

When operating upon the data stream, a portion of the data stream may be quickly found by referencing again the offset of the data stream, and mapping to the appropriate file and address within the file upon which to operate. Such might be performed when, for instance, reading that portion of the data stream. Such would also work when replicating the data stream portion to one or more secondary computing system. In that case, each secondary storage location may likewise perform the method described herein with respect to FIGS. 2 through 5. In that case, the secondary systems would only need the data stream offset, and the bytes to be written. The secondary storage system may maintain the same size files as that used by the primary, but may also have different files as compared to the secondary.

Figure 6:
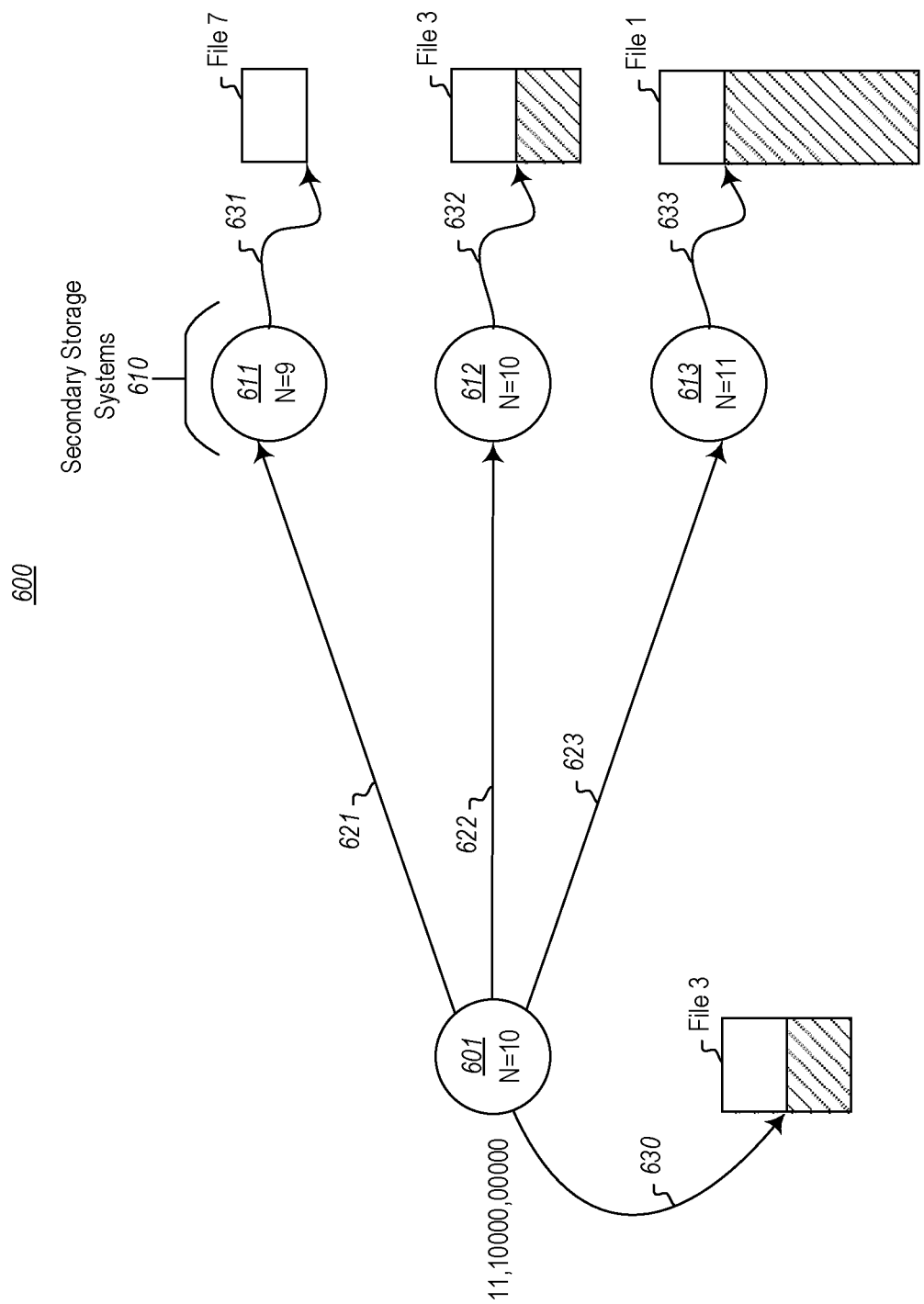
FIG. 6 illustrates a primary storage system that replicates a data stream to three secondary storage systems by simply providing the data stream offset and the bytes to be written, where each secondary uses different sized files to store the data stream.

For instance, in the embodiment of FIG. 6, a primary storage system 601 replicates a data stream to three secondary storage systems 611, 612 and 613 (collectively represented as "secondary storage systems 610"). Suppose that for primary storage system 601 "n" is 10 (i.e., each file is 1.0 KB). Now suppose that secondary storage system 611 has "n" being 9 (i.e., each file is 0.5 KB), secondary storage system 612 has "n" being 10 (i.e., each file is 1.0 KB), and secondary storage system 613 has "n" being 11 (i.e., each file is 1.0 KB). Now suppose that each file is named by its significant bits n+1 and greater.

In this context, suppose that a data stream portion at data stream offset 11,10000,00000 (expressed in binary) is to be written with two hundred bytes of data. This example is shown in FIG. 6. In that case, the offset is used by primary storage system 601 to identify that file 11 (file 3 in base ten or hexadecimal) is to be written to at location 10000,00000 (represented by arrow 630). While this is happening, the primary storage system 601 transmits just the offset 11,10000,00000 and the 200 bytes to each of the secondary computing systems 611, 612 and 613 (as represented by arrows 621, 622 and 623). The secondary computing system 611 (operating with "n" being nine) would write to file 111 (7 in base ten or hexadecimal) from the beginning at address 0000,00000 (represented by arrow 631). The secondary computing system 612 (operating with "n" being ten) would write to file 11 (3 in base ten or hexadecimal) beginning at the address 10000,00000 (i.e., beginning at the halfway point of the file) (represented by arrow 632). The secondary computing system 613 (operating with "n" being eleven) would write to file 1 from the three quarters point in the file from locations 1,10000,00000 (represented by arrow 633).

Thus, each primary and secondary storage system may perform the method without agreeing to the size of the file. Each may use a size of file that is appropriate for their individual computing system. Furthermore, because the mapping is stateless, there is high probability that if the secondary storage system confirms receipt of the message containing the data stream offset, and the actual bytes to be written, that the actually writing would be accomplished. Accordingly, the primary computing system might return a successful write immediately upon receiving a receive acknowledgement from a predetermined number (one, two or a majority of the secondary storage systems), allowing the provider of the data stream to continue providing the data stream, or release the process writing the data stream portion. How far valid data was written to the stream may be determined by the producer of the stream. The producer can write information on the header of each stream block that identifies the block, has a checksum of the data contained in the block and a link to a previous block. With such information, the producer can determine how far a stream was written and which copies have the furthest consistent end of stream.

The principles described herein also is consistent with systems in which there is first a request to write into storage and second a confirmation that the write is complete. The system will support a stream in which writes are made into storage for one part of the stream, even though writes for previous parts of the stream have not yet been confirmed as completed. The official end of the written stream is based on requests that are confirmed as written (leaving the written stream without holes). As an example, suppose stream offsets 11, 12 and 13 are requested to be written. Suppose that then, offsets 11 and 13 are confirmed hardened by the underlined storage. At that time, the end of the written stream is offset 11. Once offset 12 is confirmed as written, then offset 13 becomes the end of the written stream. When considering replication, hardening of a specific block may be achieved when a certain number of replicas (e.g.: more than half) confirm their local hardening.

Thus, the principles described herein provide for an effective mechanism to write data streams into storage. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
   one or more processors;
   one or more computer-readable media having thereon computer-executable instructions that are structured such that, when executed by the one or more processors, cause the computing system to perform steps for storing incoming data into a plurality of files, the incoming data being received in an incoming data stream, the steps comprising:
   establishing a sequential plurality of files in which to successively store data from an incoming data stream, each file in the plurality of files having the same size;
   receiving the incoming data stream, the incoming data stream comprising a plurality of portions;
   for each portion of received data, determining a particular file of the sequential plurality of files in which to store the each portion of the incoming data stream, the particular file of the sequential plurality of files in which to store the each stream portion of the incoming data stream being directly determined by a mathematical function of the stream address of the each stream portion of the data stream and the size of the sequential plurality of files, the particular file determined such that later received data will always be stored in either the same particular file or a later file in the sequential plurality of files as earlier received data; and
   writing data from the incoming data stream into the sequential plurality of files, each portion of the data being written into the particular file of the sequential plurality of files determined for the each portion of data, wherein an earlier received portion of data is written to an earlier particular file and a later received portion of data is written to the unwritten remainder of the earlier particular file and a later particular file in the sequential plurality of files and wherein the earlier particular file is determined by the mathematical function of the stream address of the earlier received portion of data and the later particular file is determined by the mathematical function of the stream address of the later received portion of data.

2. The computing system in accordance with claim 1, the same size being of size $2^n$ bytes, where n is a whole number.

3. The computing system in accordance with claim 2, a name of each or the plurality of files including one or more most significant address bits of the byte address of each corresponding file to thereby make a name of each of the plurality of files unique amongst all of the plurality of files.

4. The computing system in accordance with claim 1, wherein a file address at which to store each stream portion of the incoming data stream is determined by a mathematical function of the stream address of the respective stream portion.

5. The computing system in accordance with claim 1, the act of establishing the plurality of files comprising:
   an act of establishing files so as to have a buffer of a plurality of unpopulated files ahead of a current file that is being populated with the incoming data stream.

6. The computing system in accordance with claim 1, further comprising:
   an act of deleting or recycling populated files that correspond to an earlier portion of the incoming data stream upon the occurrence of one or more conditions.

7. The computing system in accordance with claim 6, the one or more conditions comprising a confirmation of a completed checkpointing of the earlier portion of the incoming data stream.

8. The computing system in accordance with claim 1, each of the plurality of files being a logical file that is supported by a larger physical file, such that stream portions that exceed a remaining size of the corresponding logical file can nonetheless be written into the corresponding physical file, and a corresponding compensation is noted in the next file.

9. The computing system in accordance with claim 1, further comprising:
   an act of replicating the data stream to one or more secondary computing systems.

10. The computing system in accordance with claim 9, the plurality of files being a first plurality of files, where each of at least one of the one or more secondary computing systems performs the following:
    establishing a second sequential plurality of files in which to successively store data from the incoming data stream;
    writing data from the incoming data stream into the second sequential plurality of files, the data being written in portions wherein each portion of data is written into one of the second sequential plurality of files, the one file in which to store each stream portion of the incoming data stream being determined by a mathematical function of the stream address of the each stream portion of the data stream.

11. The computing system in accordance with claim 10, the first plurality of files each having a first same size, the second plurality of files each having a second same size.

12. The computing system in accordance with claim 11, the first same size being different than the second same size.

13. The computing system in accordance with claim 1, the incoming data stream comprising an event stream comprising log entries.

14. The computing system in accordance with claim 1, the incoming data stream comprising an event stream that includes transaction events.

15. The computing system in accordance with claim 1, the incoming data stream comprising a video stream.

16. The computing system in accordance with claim 1, the incoming data stream comprising an audio stream.

17. A method for storing incoming data into a plurality of files, the incoming data being received in an incoming data stream, the method comprising:
    establishing a sequential plurality of files in which to successively store data from an incoming data stream, each file in the plurality of files having the same size;
    receiving the incoming data stream, the incoming data stream comprising a plurality of portions;
    for each portion of received data, determining a particular file of the sequential plurality of files in which to store the each portion of the incoming data stream, the particular file of the sequential plurality of files in which to store the each stream portion of the incoming data stream being directly determined by a mathematical function of the stream address of the each stream portion of the data stream and the size of the sequential plurality of files, the particular file determined such that later received data will always be stored in either the same particular file or a later file in the sequential plurality of files as earlier received data; and writing data from the incoming data stream into the sequential plurality of files, each portion of the data being written into the particular file of the sequential plurality of files determined for the each portion of data, wherein an earlier received portion of data is written to an earlier particular file and a later received portion of data is written to the unwritten remainder of the earlier particular file and a later particular file in the sequential plurality of files and wherein the earlier particular file is determined by the mathematical function of the stream address of the earlier received portion of data and the later particular file is determined by the mathematical function of the stream address of the later received portion of data.

18. A computer program product comprising one or more computer-readable storage media having thereon computer-executable instructions that are structured such that, when executed by one or more processors of a computing system, the computing system is configured to perform steps for storing incoming data into a plurality of files, the incoming data being received in an incoming data stream, the steps comprising:

establishing a sequential plurality of files in which to successively store data from an incoming data stream, each file in the plurality of files having the same size;

receiving the incoming data stream, the incoming data stream comprising a plurality of portions;

for each portion of received data, determining a particular file of the sequential plurality of files in which to store the each portion of the incoming data stream, the particular file of the sequential plurality of files in which to store the each stream portion of the incoming data stream being directly determined by a mathematical function of the stream address of the each stream portion of the data stream and the size of the sequential plurality of files, the particular file determined such that later received data will always be stored in either the same particular file or a later file in the sequential plurality of files as earlier received data; and writing data from the incoming data stream into the sequential plurality of files, each portion of the data being written into the particular file of the sequential plurality of files determined for the each portion of data, wherein an earlier received portion of data is written to an earlier particular file and a later received portion of data is written to the unwritten remainder of the earlier particular file and a later particular file in the sequential plurality of files and wherein the earlier particular file is determined by the mathematical function of the stream address of the earlier received portion of data and the later particular file is determined by the mathematical function of the stream address of the later received portion of data.

* * * * *